US010313659B2

(12) United States Patent
Onomura

(10) Patent No.: US 10,313,659 B2
(45) Date of Patent: *Jun. 4, 2019

(54) STEREOSCOPIC DISTANCE MEASURING APPARATUS, STEREOSCOPIC DISTANCE MEASURING METHOD, AND COMPUTER READABLE MEDIUM

(71) Applicant: SUBARU CORPORATION, Tokyo (JP)

(72) Inventor: Yoichi Onomura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 15/638,572

(22) Filed: Jun. 30, 2017

(65) Prior Publication Data

US 2018/0077403 A1    Mar. 15, 2018

(30) Foreign Application Priority Data

Sep. 15, 2016  (JP) ................................ 2016-180118

(51) Int. Cl.
| H04N 13/00 | (2018.01) |
| H04N 13/246 | (2018.01) |
| H04N 13/296 | (2018.01) |
| B64D 47/08 | (2006.01) |
| H04N 3/14 | (2006.01) |
| H04N 5/232 | (2006.01) |

(Continued)

(52) U.S. Cl.
CPC ........... *H04N 13/246* (2018.05); *B64D 47/08* (2013.01); *G01S 11/12* (2013.01); *G01S 19/00* (2013.01);

(Continued)

(58) Field of Classification Search
CPC .. H04N 13/246; H04N 13/106; H04N 13/296; H04N 3/155; H04N 5/23258;

(Continued)

(56) References Cited

U.S. PATENT DOCUMENTS 4,805,015 A * 2/1989 Copeland ................ G01S 13/89
                                                        348/48
6,999,005 B2   2/2006 Okada et al.
(Continued)

FOREIGN PATENT DOCUMENTS

JP        4328551 B2    9/2009
JP     2018-095231 A   6/2018

OTHER PUBLICATIONS

Japanese Office Action issued in corresponding Japanese Patent Application No. 2016-204786, dated Sep. 25, 2018, with English Translation.

*Primary Examiner* — Ping Y Hsieh
(74) *Attorney, Agent, or Firm* — McDermott Will & Emery LLP

(57) ABSTRACT

Provided are a stereoscopic distance measuring apparatus and method, and a computer readable program. The apparatus includes first and second optical cameras, first and second position-posture meters, an image corrector, and a stereoscopic distance measuring unit. The first and second position-posture meters acquire first and second position-posture information regarding the first and second optical cameras. The image corrector corrects, on the basis of the first and second position-posture information, positions and orientations of a plurality of first and second images taken by the first and second optical cameras, to generate a plurality of first and second corrected images. The stereoscopic distance measuring unit calculates a distance to a photographing target, on the basis of a pair of the corrected images including one of the plurality of the first corrected images and one of the plurality of the second corrected images.

11 Claims, 4 Drawing Sheets

(51) Int. Cl.
*G01S 19/00* (2010.01)
*G01S 11/12* (2006.01)
*H04N 13/239* (2018.01)
*H04N 13/106* (2018.01)
*G01S 19/48* (2010.01)
*G03B 37/00* (2006.01)
*G03B 37/04* (2006.01)

(52) U.S. Cl.
CPC ............ *G01S 19/48* (2013.01); *H04N 3/155* (2013.01); *H04N 5/23258* (2013.01); *H04N 13/106* (2018.05); *H04N 13/239* (2018.05); *H04N 13/296* (2018.05); *G03B 37/00* (2013.01); *G03B 37/04* (2013.01); *H04N 13/00* (2013.01)

(58) Field of Classification Search
CPC ......... B64D 47/08; G01S 11/12; G01S 19/48; G03B 37/04
See application file for complete search history.

(56) References Cited

U.S. PATENT DOCUMENTS

| | | | |
|---|---|---|---|
| 2004/0174453 A1* | 9/2004 | Okada | B64D 47/08 348/333.06 |
| 2012/0038627 A1* | 2/2012 | Sung | G06T 7/0042 345/419 |
| 2012/0229628 A1* | 9/2012 | Ishiyama | H04N 5/23212 348/135 |
| 2013/0038692 A1* | 2/2013 | Ohtomo | G05D 1/0016 348/46 |
| 2013/0258066 A1* | 10/2013 | Asano | G03B 35/08 348/47 |
| 2015/0235427 A1* | 8/2015 | Nobori | G06T 19/006 345/629 |
| 2018/0091797 A1* | 3/2018 | Armatorio | H04N 13/239 |
| 2018/0105286 A1* | 4/2018 | Onomura | H04N 13/246 |
| 2018/0184077 A1* | 6/2018 | Kato | H04N 13/344 |

* cited by examiner

STEREOSCOPIC DISTANCE MEASURING APPARATUS, STEREOSCOPIC DISTANCE MEASURING METHOD, AND COMPUTER READABLE MEDIUM

CROSS-REFERENCE TO RELATED APPLICATIONS

The present application claims priority from Japanese Patent Application No. 2016-180118 filed on Sep. 15, 2016, the entire contents of which are hereby incorporated by reference.

BACKGROUND

The technology relates to a stereoscopic distance measuring apparatus that measures a distance utilizing a stereoscopic camera mounted on an aircraft, a stereoscopic distance measuring method, and a computer readable medium having a stereoscopic distance measuring program.

Aircrafts generally utilize radar mounted on their airframes, in a measurement of a distance from the own aircraft to a predetermined target. But distance measuring apparatuses that send out radio waves, e.g., the radar, have a disadvantage that a position of the own aircraft may be detected by others.

For example, Japanese Patent (JP-B2) No. 4,328,551 makes a proposal for a distance measuring technique utilizing a stereoscopic camera mounted on an airframe. This technique does not involve sending out the radio waves. In addition, this technique makes it possible to acquire image information.

Moreover, the technique described in JP-B2 No. 4,328,551 includes detecting posture information of the airframe, and controlling a posture of the stereoscopic camera utilizing the posture information. This makes it possible to acquire images in a constant orientation, regardless of a posture of the airframe.

SUMMARY

In such a stereoscopic distance measuring apparatus that measures a distance utilizing a stereoscopic camera, high measurement precision is desired, with expectation of further enhancement in the measurement precision.

It is desirable to provide a stereoscopic distance measuring apparatus, a stereoscopic distance measuring method, and a computer readable medium having a program that make it possible to enhance measurement precision.

An aspect of the technology provides a stereoscopic distance measuring apparatus including a first optical camera and a second optical camera, a first position-posture meter, a second position-posture meter, an image corrector, and a stereoscopic distance measuring unit. The first optical camera and the second optical camera are disposed in spaced relation to each other and constitute a stereoscopic camera. The first position-posture meter is provided in the vicinity of the first optical camera and acquires first position-posture information regarding a position and a posture of the first optical camera. The second position-posture meter is provided in the vicinity of the second optical camera and acquires second position-posture information regarding a position and a posture of the second optical camera. The image corrector corrects, on the basis of the first position-posture information, positions and orientations of a plurality of first images taken by the first optical camera, to generate a plurality of first corrected images, and corrects, on the basis of the second position-posture information, positions and orientations of a plurality of second images taken by the second optical camera, to generate a plurality of second corrected images. The stereoscopic distance measuring unit calculates a distance to a photographing target, on the basis of a pair of corrected images that include one of the plurality of the first corrected images and one of the plurality of the second corrected images.

The stereoscopic distance measuring apparatus may further include a time acquiring unit that acquires global positioning system (GPS) time information and associates the GPS time information with each of the plurality of the first images and with each of the plurality of the second images.

The stereoscopic distance measuring unit may select, on the basis of the GPS time information, the pair of the corrected images whose timing of imaging coincide with each other, from the plurality of the first corrected images and from the plurality of the second corrected images, and calculate the distance to the photographing target utilizing the pair of the corrected images.

The time acquiring unit may include a first GPS receiver provided in the vicinity of the first optical camera, and a second GPS receiver provided in the vicinity of the second optical camera. The time acquiring unit may associate the GPS time information acquired by the first GPS receiver with each of the plurality of the first images, and associate the GPS time information acquired by the second GPS receiver with each of the plurality of the second images.

The first optical camera and the first position-posture meter may be fixed to a first holder that is common to the first optical camera and the first position-posture meter and is made of metal. The second optical camera and the second position-posture meter may be fixed to a second holder that is common to the second optical camera and the second position-posture meter and is made of metal.

The first optical camera and the second optical camera may be separately disposed at tips of both wings of an aircraft.

An aspect of the technology provides a stereoscopic distance measuring method including: allowing a first optical camera and a second optical camera to respectively take a plurality of first images and a plurality of second images, in which the first optical camera and the second optical camera are disposed in spaced relation to each other and constitute a stereoscopic camera; allowing a first position-posture meter to acquire first position-posture information regarding a position and a posture of the first optical camera, in which the first position-posture meter is provided in the vicinity of the first optical camera; allowing a second position-posture meter to acquire second position-posture information regarding a position and a posture of the second optical camera, in which the second position-posture meter is provided in the vicinity of the second optical camera; correcting, on the basis of the first position-posture information, positions and orientations of the plurality of the first images, to generate a plurality of first corrected images; correcting, on the basis of the second position-posture information, positions and orientations of the plurality of the second images, to generate a plurality of second corrected images; and calculating a distance to a photographing target, on the basis of a pair of corrected images that include one of the plurality of the first corrected images and one of the plurality of the second corrected images.

An aspect of the technology provides a non-transitory computer readable medium having a program. The program causes a computer to: allow a first optical camera and a second optical camera to respectively take a plurality of first images and a plurality of second images, in which the first optical camera and the second optical camera are disposed in spaced relation to each other and constitute a stereoscopic camera; allow a first position-posture meter to acquire first position-posture information regarding a position and a posture of the first optical camera, in which the first position-posture meter is provided in the vicinity of the first optical camera; allow a second position-posture meter to acquire second position-posture information regarding a position and a posture of the second optical camera, in which the second position-posture meter is provided in the vicinity of the second optical camera; correct, on the basis of the first position-posture information, positions and orientations of the plurality of the first images, to generate a plurality of first corrected images; correct, on the basis of the second position-posture information, positions and orientations of the plurality of the second images, to generate a plurality of second corrected images; and calculate a distance to a photographing target, on the basis of a pair of corrected images that include one of the plurality of the first corrected images and one of the plurality of the second corrected images.

An aspect of the technology provides a stereoscopic distance measuring apparatus including a first optical camera and a second optical camera, a first position-posture meter, a second position-posture meter, and circuitry. The first optical camera and the second optical camera are disposed in spaced relation to each other and constitute a stereoscopic camera. The first position-posture meter is provided in the vicinity of the first optical camera and acquires first position-posture information regarding a position and a posture of the first optical camera. The second position-posture meter is provided in the vicinity of the second optical camera and acquires second position-posture information regarding a position and a posture of the second optical camera. The circuitry corrects, on the basis of the first position-posture information, positions and orientations of a plurality of first images taken by the first optical camera, to generate a plurality of first corrected images. The circuitry corrects, on the basis of the second position-posture information, positions and orientations of a plurality of second images taken by the second optical camera, to generate a plurality of second corrected images. The circuitry calculates a distance to a photographing target, on the basis of a pair of corrected images that include one of the plurality of the first corrected images and one of the plurality of the second corrected images.

DETAILED DESCRIPTION

In the following, some implementations of the technology are described with reference to the drawings.

[Configuration of Stereoscopic Distance Measuring Apparatus]

First, a configuration of a stereoscopic distance measuring apparatus 1 according to this implementation is described with reference to FIGS. 1, 2A, and 2B.

Figure 1:
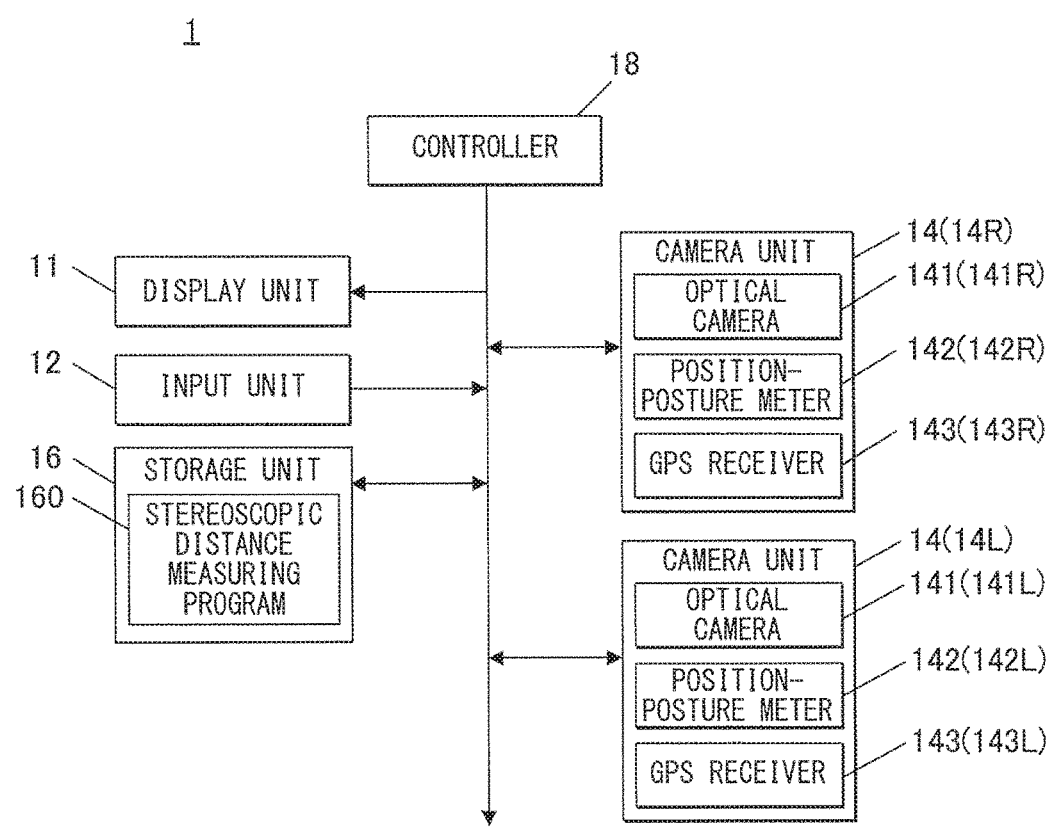
FIG. 1 is a block diagram that illustrates a functional configuration of a stereoscopic distance measuring apparatus according to one implementation of the technology.
Figure 2A:
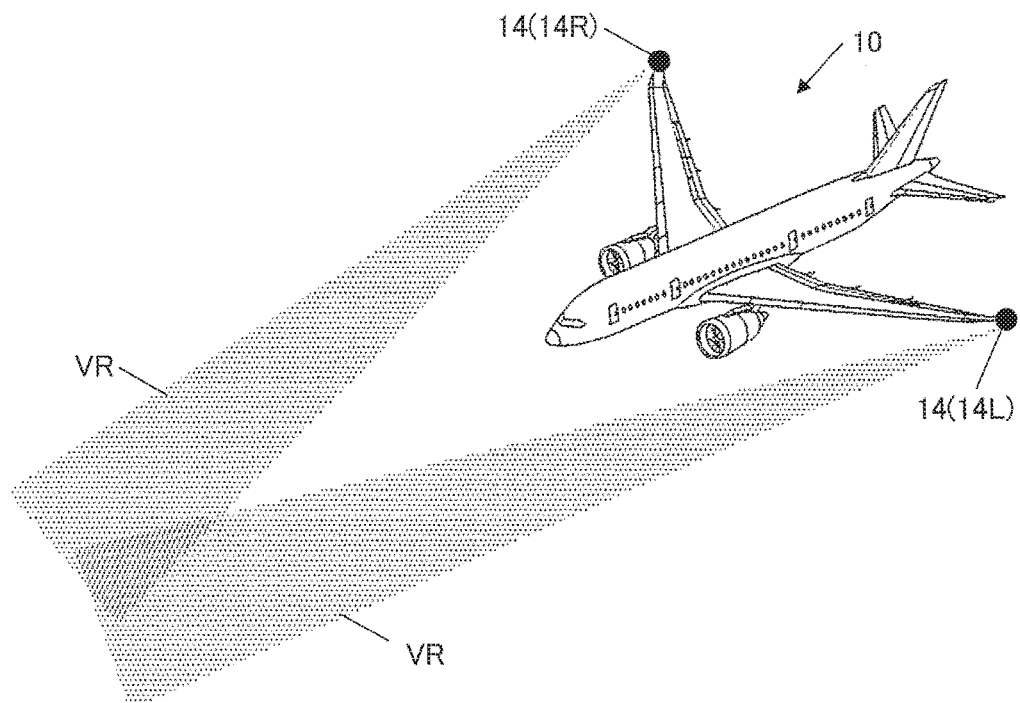
FIGS. 2A and 2B illustrate camera units.

FIG. 1 is a block diagram that illustrates a functional configuration of the stereoscopic distance measuring apparatus 1. FIGS. 2A and 2B illustrate camera units 14 described later, of the stereoscopic distance measuring apparatus 1.

The stereoscopic distance measuring apparatus 1 may be mounted on, for example but not limited to, an aircraft 10, e.g., a fixed wing aircraft. The stereoscopic distance measuring apparatus 1 may measure a distance from the aircraft 10 to a photographing target, on the basis of a stereoscopic image acquired.

In one specific but non-limiting example, referring to FIG. 1, the stereoscopic distance measuring apparatus 1 may include a display unit 11, an input unit 12, two camera units 14, a storage unit 16, and a controller 18.

The display unit 11 may include an undepicted display. The display unit 11 may display various pieces of information on the display, on the basis of a display signal inputted from the controller 18.

The input unit 12 may include undepicted input receiving instrumentation. The input unit 12 may supply the controller 18 with a signal corresponding to an input operation made by an operator on the input receiving instrumentation.

The two camera units 14 may acquire a stereoscopic image outside the aircraft 10. As illustrated in FIG. 2A, the two camera units 14 may be disposed separately at tips of both wings of the aircraft 10, in widely-spaced relation to each other.

Figure 2B:
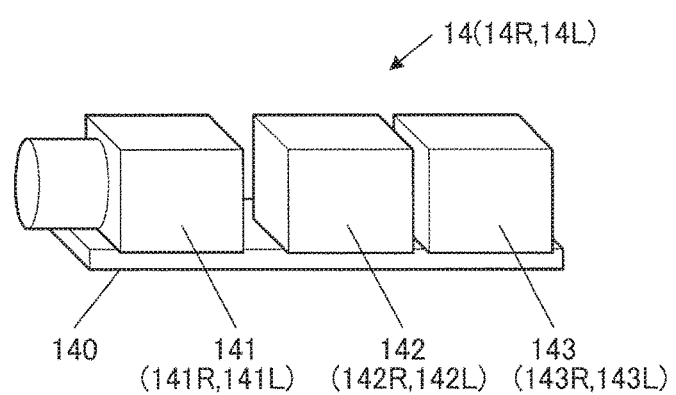

As illustrated in FIG. 2B, each of the camera units 14 may include an optical camera 141, a position-posture meter 142, and a global positioning system (GPS) receiver 143. In each of the camera units 14, these parts may be disposed on, or fixed to, a fixing plate 140, closely to one another. These parts may be so integrally united as not to change in their positions and postures. The fixing plate 140 may have high rigidity and be made of metal. Although undepicted, the fixing plate 140 may be so supported as to be able to change a direction of a visual axis of the optical camera 141.

It is to be noted that in the following description, the reference characters of the camera unit 14 mounted on a right wing of the aircraft 10 and the parts of the relevant camera unit 14 are followed by "R", while the reference characters of the camera unit 14 mounted on a left wing and the parts of the relevant camera unit 14 are followed by "L", in order to distinguish one from the other.

The optical camera 141 may acquire, on the basis of a control instruction from the controller 18, an image outside the aircraft 10, and supply the controller 18 with image information acquired. The optical camera 141 may be provided in each of the two camera units 14. Thus, the two optical cameras 141 may constitute a pair and function as a stereoscopic camera. As illustrated in FIG. 2A, the optical cameras 141 may be spaced away from each other at a predetermined distance in an initial state, with their visual fields or ranges VR overlapping with each other so as to be able to acquire the stereoscopic image.

As used here, the term "initial state" means a state in which the aircraft 10 is stopped on the ground.

The position-posture meter 142 may acquire position-posture information, i.e., information regarding a position and a posture or an orientation of the associated optical camera 141 of the same camera unit 14. The position-posture meter 142 may acquire, on the basis of a control instruction from the controller 18, the position-posture information of the relevant optical camera 141, and supply the position-posture information to the controller 18. In one more specific but non-limiting example, the position-posture meter 142 may be supplied, in advance, with an angular shift in the initial state between the visual axis of the optical camera 141 and an axis of a posture measurement of the relevant position-posture meter 142, and with a positional shift in the initial state between the optical camera 141 and the relevant position-posture meter 142. The angular shift and the positional shift in the initial state may be measured and calculated in advance. The position-posture meter 142 may acquire position-posture information of the position-posture meter 142 itself, and offset the position-posture information of the position-posture meter 142 itself thus acquired, by an amount of the angular shift and an amount of the positional shift with respect to the optical camera 141 that are supplied in advance. Thus, the position-posture meter 142 may acquire the position-posture information of the relevant optical camera 141.

The GPS receiver 143 may acquire photographing time of images taken by the associated optical camera 141 of the same camera unit 14, in this implementation. The GPS receiver 143 may receive, on the basis of a control instruction from the controller 18, a GPS signal including GPS time information from a GPS satellite, and supply the GPS signal to the controller 18.

As illustrated in FIG. 1, the storage unit 16 may be a memory that stores programs and data to achieve various functions of the stereoscopic distance measuring apparatus 1 and also serves as a work area. In this implementation, the storage unit 16 may store a stereoscopic distance measuring program 160.

The stereoscopic distance measuring program 160 may be a program that causes the controller 18 to execute a stereoscopic distance measuring process described later.

The controller 18 may be provided in a body of the aircraft 10. The controller 18 may execute, on the basis of an instruction inputted, a process based on a predetermined program, give instructions to each functional part or perform data transfer to each functional part, and perform a general control of the stereoscopic distance measuring apparatus 1. In one specific but non-limiting example, the controller 18 may read, in response to a signal such as an operation signal inputted from the input unit 12, various programs stored in the storage unit 16, and execute processes in accordance with the programs. The controller 18 may temporarily store results of the processes in the storage unit 16, while allowing the display unit 11 to output the results of the processes as appropriate.

Figure 3:
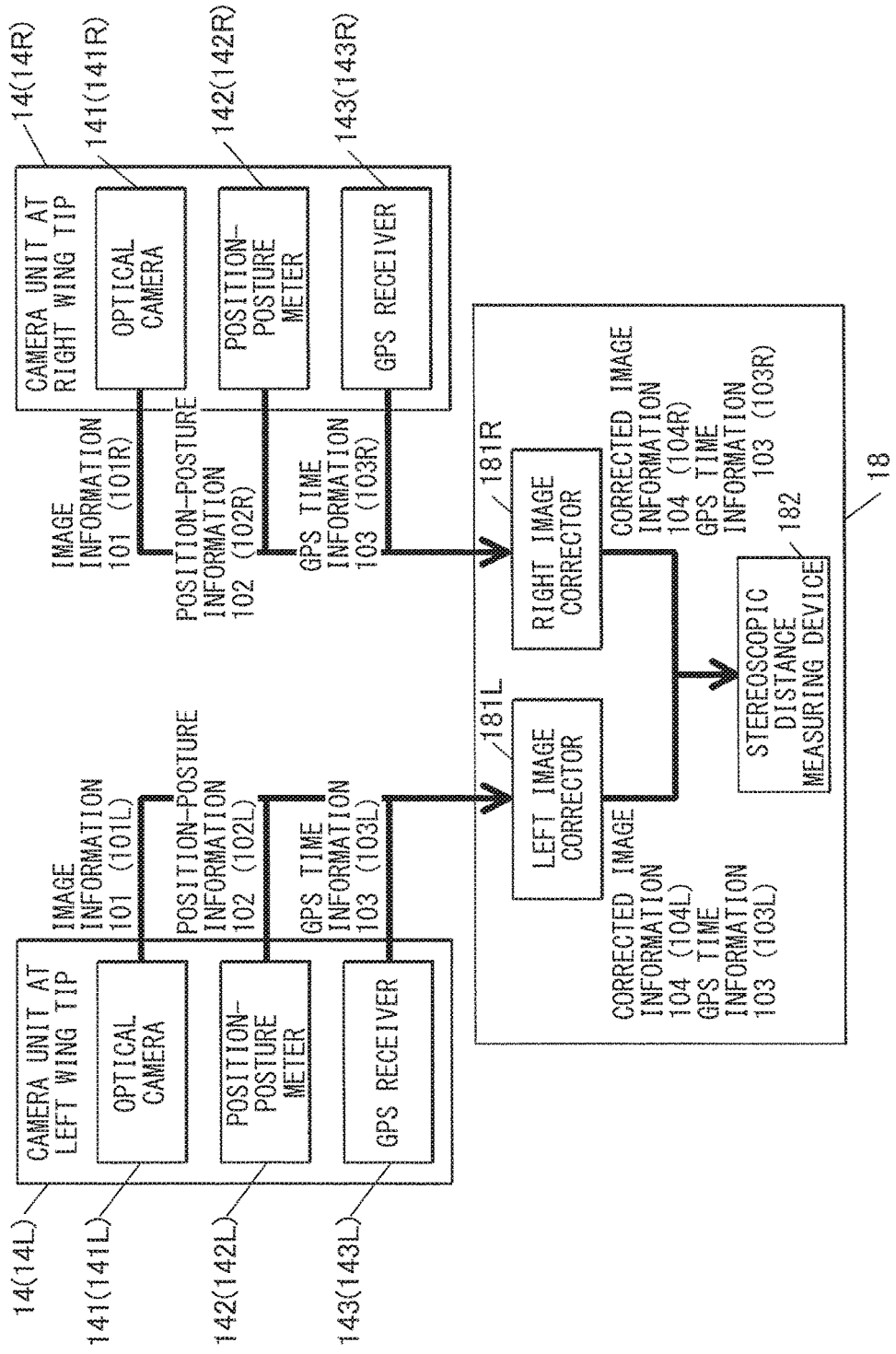
FIG. 3 is a data flow diagram that illustrates a flow of data in a stereoscopic distance measuring process.

Moreover, as described later, the controller 18 may include a right image corrector 181R, a left image corrector 181L, and a stereoscopic distance measuring device 182, as illustrated in FIG. 3. The right image corrector 181R, the left image corrector 181L and the stereoscopic distance measuring device 182 may serve as various functional units in the stereoscopic distance measuring process.

[Operation of Stereoscopic Distance Measuring Apparatus]

Description is given next of operation of the stereoscopic distance measuring apparatus 1 in executing the stereoscopic distance measuring process.

Figure 4:
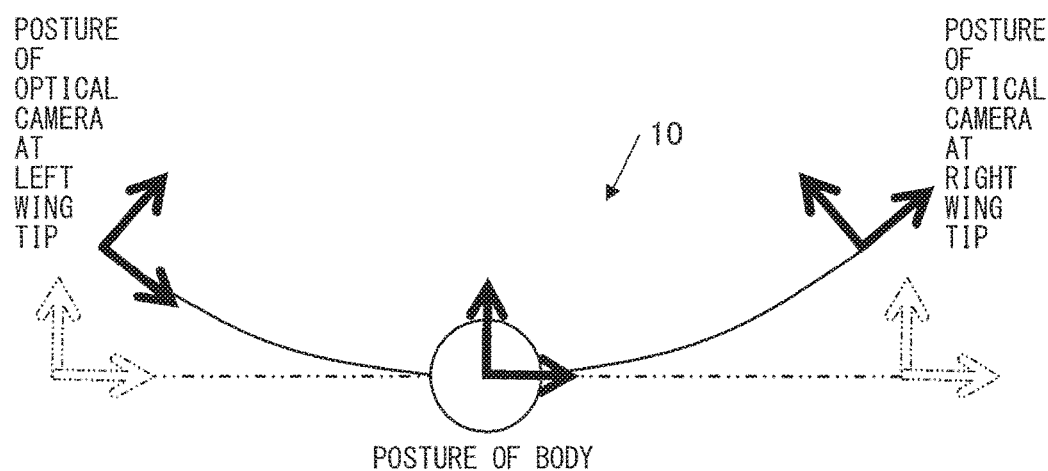
FIG. 4 is a conceptual diagram that illustrates deformation of both wings of an airframe in flight.
Figure 5A:
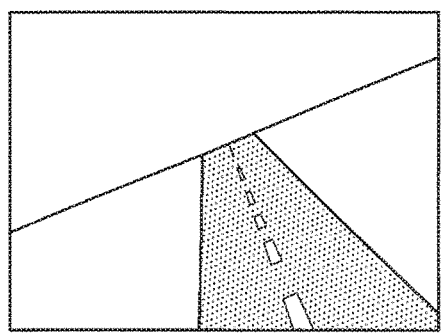
FIGS. 5A and 5B are conceptual diagrams that illustrate a change in an image before and after a correction in the stereoscopic distance measuring process.
Figure 5B:
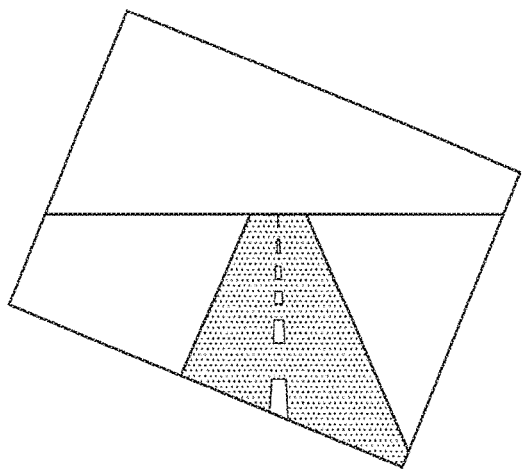

FIG. 3 is a data flow diagram that illustrates a flow of data in the stereoscopic distance measuring process. FIG. 4 is a conceptual diagram that illustrates deformation of both the wings of the airframe in flight. FIGS. 5A and 5B are conceptual diagrams that illustrate a change in the image before and after a correction in the stereoscopic distance measuring process.

The stereoscopic distance measuring process may be a process that includes acquiring the stereoscopic image with the pair of the optical cameras 141R and 141L, and calculating, on the basis of the stereoscopic image, the distance from the aircraft 10 to the photographing target. Upon an input of an instruction to execute the process by, for example, an operation by an operator, the controller 18 may read the stereoscopic distance measuring program 160 from the storage unit 16 and develop the stereoscopic distance measuring program 160, to execute the stereoscopic distance measuring process.

Note that it is assumed for this implementation that the photographing target, i.e., a target of a distance measurement, is on the ground below the airframe, and the photographing target is photographed from the aircraft 10 in flight. However, a location of the photographing target is not limited thereto. In one alternative, the photographing target may be level with or above the aircraft 10 in flight, or alternatively, the photographing target may be at the sea or in the air.

As described below, various pieces of information may be acquired from the optical cameras 141 and the position-posture meters 142 of the two camera units 14 mounted on the right and left wings. The reference characters of the various pieces of information are followed by "R" or "L", in order to identify a source of the information, i.e., the camera unit 14 mounted on the right wing or the camera unit 14 mounted on the left wing.

As illustrated in FIG. 3, upon the execution of the stereoscopic distance measuring process, the controller 18 may, first, allow the pair of the optical cameras 141R and 141L on the right and left wings to acquire image information 101, i.e., image information 101R and 101L. The image information 101 may represent an image outside the aircraft 10. The image outside the aircraft 10 may be either a still image or a moving image. At this occasion, in each of the camera units 14, position-posture information 102 of the optical camera 141 and GPS time information 103 may be associated with the image information 101 and outputted to the controller 18. The position-posture information 102 of the optical camera 141 may be acquired by the position-posture meter 142. The GPS time information 103 may be acquired by the GPS receiver 143. The image information 101 may be acquired by the optical camera 141.

Thereafter, the controller 18 may allow the right image corrector 181R and the left image corrector 181L to separately correct a pair of pieces of the image information 101R and 101L acquired by the pair of the optical cameras 141R and 141L.

In the aircraft 10 in flight, as illustrated in FIG. 4, both the wings of the airframe are so deformed as to warp upward. This deformation causes a change in relative positions and postures of the two camera units 14R and 14L disposed at the tips of both the wings from the initial state, i.e., the state in which the airframe is stopped on the ground. Therefore, simply utilizing the stereoscopic image taken by the pair of the optical cameras 141R and 141L in this state may become a hindrance to a precise measurement of the distance to the photographing target.

Thus, the controller 18 may calculate changes in the positions and the postures or the orientations of the optical cameras 141 from the initial state, on the basis of the position-posture information 102 of the optical cameras 141 acquired by the respective position-posture meters 142. The controller 18 may correct the image information 101 by amounts of the changes.

In one specific but non-limiting example, the right image corrector 181R may correct positions and orientations of the images in the image information 101R taken by the optical camera 141R, on the basis of the position-posture information 102R of the optical camera 141R associated with the image information 101R. Thus, the right image corrector 181R may generate corrected image information 104R subjected to the correction. Likewise, the left image corrector 181L may correct positions and orientations of the images in the image information 101L taken by the optical camera 141L, on the basis of the position-posture information 102L of the optical camera 141L associated with the image information 101L. Thus, the left image corrector 181L may generate corrected image information 104L subjected to the correction. At this occasion, the GPS time information 103 associated with each piece of the image information 101 before the correction, i.e., the GPS time information 103R and 103L, may be maintained as it is.

FIG. 5A illustrates an example of an image taken by one of the optical cameras 141 whose position and posture have changed from the initial state. FIG. 5B illustrates an example of an image resulting from the correction. As illustrated in FIG. 5B, the resultant image may be an image that would have been taken by the relevant optical camera 141 in the initial state.

Thereafter, as illustrated in FIG. 3, the controller 18 may utilize, as the stereoscopic image, the pair of pieces of the corrected image information 104 thus acquired, i.e., the corrected image information 104R and the corrected image information 104L, and allow the stereoscopic distance measuring device 182 to calculate the distance to the photographing target. At this occasion, the stereoscopic distance measuring device 182 may refer to the GPS time information 103 associated with each piece of the corrected image information 104, i.e., the GPS time information 103R and 103L, and select a pair of pieces of the corrected image information 104 whose timing of imaging coincide with each other. The situation that "the timing of the imaging coincide with each other" is to be construed as including a situation that a time difference between points in time indicated by the two pieces of the GPS time information 103R and 103L falls within a range in which the points in time are regarded as the same point in time. The stereoscopic distance measuring device 182 may collate the pair of pieces of the corrected image information 104, to calculate the distance.

In this way, the distance to the photographing target is appropriately measured, with the stereoscopic image based on the pair of pieces of the corrected image information 104 whose timing of the imaging coincide with each other and in which the changes in the positions and the postures of the respective optical cameras 141 in flight are corrected.

Further explanation is given below. In applications of distance measurements utilizing a stereoscopic camera mounted on an aircraft, distances to be measured are far longer than those in, for example, general applications such as monitoring applications. It is therefore desirable to provide a large interval between two cameras that constitute the stereoscopic camera.

However, with the two cameras spaced apart from each other, it is generally difficult to support the two cameras integrally with high rigidity. For example, a possible method to space the two cameras as apart as possible from each other on a fixed wing aircraft may be to dispose the two cameras on both wings of an airframe. But main wings of an aircraft are deformed, or warp, in accordance with forces such as lift, and therefore fail in keeping relative states, e.g., positions and postures, of the two cameras constant.

As a result, the two cameras differ in their relative positions and postures in accordance with flight states of the airframe. This results in lowered measurement precision as the stereoscopic camera. Performing a posture control of the two cameras as in the technique described in JP-B2 4,328,551 is promising, but it is still difficult to appropriately perform the posture control of the two cameras of different positions and postures with utilization of the posture information of the airframe that is common to the two cameras.

Moreover, the two cameras are disposed at long distances from a processor that carries out a process collectively on image information from the two cameras. This may easily cause an error in image transmission time from the two cameras, because of extension of signal transmission paths or manufacturing tolerances in wiring lengths. The error in time, or a shift in the timing of the imaging, also results in possibility of the lowered measurement precision.

Therefore, in the stereoscopic distance measuring apparatus 1, the position-posture meters 142 are provided in the vicinity of respective ones of the pair of the optical cameras 141, and acquire the position-posture information 102. The pair of the optical cameras 141 acquire the pair of pieces of the image information 101. The pair of pieces of the image information 101 are separately corrected on the basis of the position-posture information 102 acquired by the position-posture meters 142. On the basis of the image information thus corrected, i.e., the corrected image information 104, the distance from the aircraft 10 to the photographing target is obtained. This makes it possible for the stereoscopic distance measuring apparatus 1 to obtain the distance on the basis of the corrected image information 104 in which the positions and the orientations of the images are corrected, even in a case where the pair of the optical cameras 141 have changed in the respective positions and the postures. Hence, it is possible to enhance the measurement precision.

Moreover, in the stereoscopic distance measuring apparatus 1, the pair of pieces of the corrected image information 104 whose timing of the imaging coincide with each other may be selected on the basis of the GPS time information 103. The distance from the aircraft 10 to the photographing target may be obtained on the basis of the pair of pieces of the corrected image information 104 thus selected. This makes it possible for the stereoscopic distance measuring apparatus 1 to obtain the distance on the basis of the pair of pieces of the corrected image information 104 in which the shift in the timing of the imaging is restrained, even in a case with the error in the image transmission time from the two optical cameras 141. Hence, it is possible to enhance the measurement precision.

[Effects]

As described, according to this implementation, the position-posture meters 142 are provided in the vicinity of respective ones of the pair of the optical cameras 141 that constitute the stereoscopic camera. The images in the pair of pieces of the image information 101 taken by the pair of the optical cameras 141 are separately corrected, on the basis of the position-posture information 102 acquired by the position-posture meters 142. On the basis of the pair of pieces of the corrected image information 104 thus corrected, the distance to the photographing target is calculated.

Accordingly, it is possible to appropriately correct the positions and the orientations of the images, even in a case where the pair of the optical cameras 141 are mounted on the aircraft in spaced relation to each other, and the positions and the postures of the optical cameras 141 have changed to different states from one another. Hence, it is possible to enhance the measurement precision, as compared to a case where the stereoscopic camera is mounted on the aircraft in a simply spaced state.

Moreover, each piece of the image information 101 taken by the pair of the optical cameras 141 may be associated with the GPS time information 103. On the basis of the GPS time information 103, the pair of pieces of the corrected image information 104 whose timing of the imaging coincide with each other may be selected to calculate the distance to the photographing target.

Accordingly, it is possible to suitably restrain the shift in the timing of the imaging that is likely to occur because of the extension of the signal transmission paths and the manufacturing tolerances of the wiring lengths in the case with the pair of the optical cameras 141 spaced apart from each other. Hence, it is possible to restrain the measurement precision from being lowered.

Furthermore, the GPS receivers 143 may be provided in association with the pair of the optical cameras 141, in the vicinity of respective ones of the pair of the optical cameras 141. The GPS receivers 143 may acquire the GPS time information 103. The GPS time information 103 may be associated with the image information 101 taken by the associated optical camera 141.

Accordingly, it is possible to restrain the shift in the timing of the imaging, as compared to a case where common time acquiring instrumentation separately associates a pair of optical cameras spaced apart from each other with time information. Hence, it is possible to restrain the measurement precision from being lowered.

In addition, each of the optical cameras 141 and the position-posture meter 142 associated with the relevant optical camera 141 may be fixed to the common, metal-made fixing plate 140.

Accordingly, it is possible to keep the positions and the postures of the optical camera 141 and the position-posture meter 142 constant relatively to each other, regardless of, for example, the flight states of the aircraft 10. Hence, it is possible to acquire the position-posture information 102 of the optical camera 141 more precisely, making it possible to restrain the measurement precision from being lowered.

[Modifications]

It is to be noted that the technology is not limitedly applicable to the foregoing implementations. It should be appreciated that modifications and alterations may be made by persons skilled in the art without departing from the scope as defined by the appended claims.

For example, in the forgoing implementation, the description is given referring to the example in which each of the two camera units 14 includes the GPS receiver 143. However, the single GPS receiver 143 common to the two camera units 14 may be provided. In this case, time adjustment in the initial state may be made in advance between each of the camera units 14, i.e., the optical cameras 141 and the GPS receiver 143, so as to allow the timing of the imaging in the two camera units 14 to coincide with each other.

Moreover, in the forgoing implementation, the description is given referring to the example in which the pair of the optical cameras 141 are disposed on both the wings of the aircraft 10. However, the pair of the optical cameras 141 may be disposed anywhere as long as the pair of the optical cameras 141 are mounted on the aircraft 10 in the spaced relation to each other. There is no particular limitation on the positions of the optical cameras 141 on the airframe.

In one implementation described above, the controller 18 illustrated in FIGS. 1 and 3 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 18. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIGS. 1 and 3.

The implementation also provides a program as the stereoscopic distance measuring program 160 that causes a computer to function as the controller 18, and a recording medium that stores the program. The recording medium is computer readable. Non-limiting examples of the recording medium may include a flexible disk, a magneto-optical disk, ROM, CD, DVD (Registered Trademark) and BD (Registered Trademark). As used herein, the term "program" may refer to a data processor written in any language and any description method.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A stereoscopic distance measuring apparatus, comprising:
    a first optical camera and a second optical camera that are disposed on a first wing and a second wing of an aircraft, respectively, the first optical camera and the second optical camera constitute a stereoscopic camera;
    a first position-posture meter that is provided in vicinity of the first optical camera and acquires first position-posture information regarding a position and a posture of the first optical camera;
    a second position-posture meter that is provided in vicinity of the second optical camera and acquires second position-posture information regarding a position and a posture of the second optical camera;
    an image corrector that corrects, on a basis of the first position-posture information, positions and orientations of a plurality of first images taken by the first optical camera, to generate a plurality of first corrected images, and corrects, on a basis of the second position-posture information, positions and orientations of a plurality of second images taken by the second optical camera, to generate a plurality of second corrected images;

a stereoscopic distance measuring unit that calculates a distance to a photographing target, on a basis of a pair of corrected images that include one of the plurality of the first corrected images and one of the plurality of the second corrected images; and a time acquiring unit that acquires global positioning system (GPS) time information and associates the GPS time information with each of the plurality of the first images and with each of the plurality of the second images, wherein the stereoscopic distance measuring unit
selects, on a basis of the GPS time information, the pair of the corrected images whose timing of imaging coincide with each other, from the plurality of the first corrected images and from the plurality of the second corrected images, and
calculates the distance to the photographing target utilizing the pair of the corrected images.

2. The stereoscopic distance measuring apparatus according to claim 1, wherein
the time acquiring unit includes
a first GPS receiver provided in the vicinity of the first optical camera, and
a second GPS receiver provided in the vicinity of the second optical camera, and
the time acquiring unit associates the GPS time information acquired by the first GPS receiver with each of the plurality of the first images, and associates the GPS time information acquired by the second GPS receiver with each of the plurality of the second images.

3. The stereoscopic distance measuring apparatus according to claim 2, wherein
the first optical camera and the first position-posture meter are fixed to a first holder that is common to the first optical camera and the first position-posture meter and is made of metal, and
the second optical camera and the second position-posture meter are fixed to a second holder that is common to the second optical camera and the second position-posture meter and is made of metal.

4. The stereoscopic distance measuring apparatus according to claim 3, wherein
the first optical camera and the second optical camera are separately disposed at tips of both the first and second wings of the aircraft.

5. The stereoscopic distance measuring apparatus according to claim 2, wherein
the first optical camera and the second optical camera are separately disposed at tips of both the first and second wings of the aircraft.

6. The stereoscopic distance measuring apparatus according to claim 1, wherein
the first optical camera and the first position-posture meter are fixed to a first holder that is common to the first optical camera and the first position-posture meter and is made of metal, and
the second optical camera and the second position-posture meter are fixed to a second holder that is common to the second optical camera and the second position-posture meter and is made of metal.

7. The stereoscopic distance measuring apparatus according to claim 6, wherein
the first optical camera and the second optical camera are separately disposed at tips of both the first and second wings of the aircraft.

8. The stereoscopic distance measuring apparatus according to claim 1, wherein
the first optical camera and the second optical camera are separately disposed at tips of both the first and second wings of the aircraft.

9. A stereoscopic distance measuring method, comprising:
allowing a first optical camera and a second optical camera to respectively take a plurality of first images and a plurality of second images, the first optical camera and the second optical camera being disposed on a first wing and a second wing of an aircraft, respectively, the optical camera and the second optical camera constituting a stereoscopic camera;
allowing a first position-posture meter to acquire first position-posture information regarding a position and a posture of the first optical camera, the first position-posture meter being provided in vicinity of the first optical camera;
allowing a second position-posture meter to acquire second position-posture information regarding a position and a posture of the second optical camera, the second position-posture meter being provided in vicinity of the second optical camera;
correcting, on a basis of the first position-posture information, positions and orientations of the plurality of the first images, to generate a plurality of first corrected images;
correcting, on a basis of the second position-posture information, positions and orientations of the plurality of the second images, to generate a plurality of second corrected images;
calculating a distance to a photographing target, on a basis of a pair of corrected images that include one of the plurality of the first corrected images and one of the plurality of the second corrected images; and
acquiring global positioning system (GPS) time information and associates the GPS time information with each of the plurality of the first images and with each of the plurality of the second images, wherein
the pair of the corrected images whose timing of imaging coincide with each other are selected, on a basis of the GPS time information, from the plurality of the first corrected images and from the plurality of the second corrected images, and
the distance to the photographing target is calculated utilizing the pair of the corrected images.

10. A non-transitory computer readable medium having a program causing a computer to:
allow a first optical camera and a second optical camera to respectively take a plurality of first images and a plurality of second images, the first optical camera and the second optical camera being disposed on a first wing and a second wing of an aircraft, respectively, the optical camera and the second optical camera constituting a stereoscopic camera;
allow a first position-posture meter to acquire first position-posture information regarding a position and a posture of the first optical camera, the first position-posture meter being provided in vicinity of the first optical camera;
allow a second position-posture meter to acquire second position-posture information regarding a position and a posture of the second optical camera, the second position-posture meter being provided in vicinity of the second optical camera;

correct, on a basis of the first position-posture information, positions and orientations of the plurality of the first images, to generate a plurality of first corrected images;

correct, on a basis of the second position-posture information, positions and orientations of the plurality of the second images, to generate a plurality of second corrected images;

calculate a distance to a photographing target, on a basis of a pair of corrected images that include one of the plurality of the first corrected images and one of the plurality of the second corrected images; and acquire global positioning system (GPS) time information and associates the GPS time information with each of the plurality of the first images and with each of the plurality of the second images, wherein the pair of the corrected images whose timing of imaging coincide with each other are selected, on a basis of the GPS time information, from the plurality of the first corrected images and from the plurality of the second corrected images, and the distance to the photographing tartlet is calculated utilizing the pair of the corrected images.

11. A stereoscopic distance measuring apparatus, comprising:

a first optical camera and a second optical camera that are disposed on a first wing and a second wing of an aircraft, respectively, the optical camera and the second optical camera constitute a stereoscopic camera;

a first position-posture meter that is provided in vicinity of the first optical camera and acquires first position-posture information regarding a position and a posture of the first optical camera;

a second position-posture meter that is provided in vicinity of the second optical camera and acquires second position-posture information regarding a position and a posture of the second optical camera; and circuitry that corrects, on a basis of the first position-posture information, positions and orientations of a plurality of first images taken by the first optical camera, to generate a plurality of first corrected images, corrects, on a basis of the second position-posture information, positions and orientations of a plurality of second images taken by the second optical camera, to generate a plurality of second corrected images, calculates a distance to a photographing target, on a basis of a pair of corrected images that include one of the plurality of the first corrected images and one of the plurality of the second corrected images, and acquire global positioning system (GPS) time information and associates the GPS time information with each of the plurality of the first images and with each of the plurality of the second images, wherein the pair of the corrected images whose timing of imaging coincide with each other are selected, on a basis of the GPS time information, from the plurality of the first corrected images and from the plurality of the second corrected images, and the distance to the photographing target is calculated utilizing the pair of the corrected images.

* * * * *